United States Patent [19]
Göbel et al.

[11] Patent Number: 5,342,882
[45] Date of Patent: Aug. 30, 1994

[54] AQUEOUS COATING COMPOUND, A PROCESS FOR ITS PREPARATION AND ITS USE IN PROCESSES FOR MULTILAYERED LACQUERING

[75] Inventors: Armin Göbel, Dortmund; Hans-Peter Patzschke, Wuppertal; Jürgen Doebert, Sprockhövel, all of Fed. Rep. of Germany

[73] Assignee: Herberts GmbH, Wuppertal, Fed. Rep. of Germany

[21] Appl. No.: 95,959

[22] Filed: Jul. 22, 1993

[30] Foreign Application Priority Data

Jul. 25, 1992 [DE] Fed. Rep. of Germany ....... 4224617

[51] Int. Cl.$^5$ .............................................. C08L 75/00
[52] U.S. Cl. .................... 524/832; 524/839; 524/840; 427/385.5; 427/388.4
[58] Field of Search ............... 524/832, 839, 840; 427/385.5, 388.4

[56] References Cited

U.S. PATENT DOCUMENTS 4,888,383 12/1989 Huybrechts ..................... 524/832

*Primary Examiner*—Maurice J. Welsh
*Attorney, Agent, or Firm*—Schweitzer Cornman & Gross

[57] ABSTRACT

Aqueous coating compound containing a polyurethane resin-based binder of
- I) from 60 to 100% by weight of a mixture of
  A) from 5–95% by weight of one or more self-emulsifying polyurethane resins in aqueous dispersion having a number average molar mass (Mn) of from 30000 to 300000 and containing carboxyl groups corresponding to an acid number of from 5 to 50, obtainable from a water dispersible polyurethane prepolymer having more than one free isocyanate group per molecule, by chain lengthening with water and
  B) from 95 to 5% by weight of one or more acrylated polyesters and/or acrylated polyurethanes having an acid number of from 5 to 50 in aqueous dispersion and
- II) from 0 to 40% by weight of one or more formaldehyde condensation resins and/or blocked polyisocyanates, the percentages by weight being based in each case on the resin solids content. The coating compounds are suitable in particular as basic lacquers for multi-coat lacquering. Coatings with good weather resistance are produced from them.

9 Claims, No Drawings

AQUEOUS COATING COMPOUND, A PROCESS FOR ITS PREPARATION AND ITS USE IN PROCESSES FOR MULTILAYERED LACQUERING

BACKGROUND OF THE INVENTION

This invention relates to an aqueous coating compound based on binders containing polyurethane resin and to their preparation. The coating compounds are suitable for the production of weather-resistant coats, in particular top lacquer coats. They may be used, for example, for multilayered lacquering, in particular in the field of motor vehicles.

The use of a polyurethane dispersion chain lengthened with polyamine for the preparation of hydrobase coats in combination with a clear lacquer is described in EP-A 0 089 497. According to DE-A-26 28 124 or DE-A-40 00 889, for example, good properties can be obtained by using such resins. These lacquerings, however, still leave room for improvement as regards the metallic effect and the weather resistance (sweat box test).

Water dilutable base coats are prepared according to DE-A-39 15 458 and EP-A-0 379 158 from combinations of acrylate resins and polyurethane dispersions which undergo uncontrollable chain lengthening when dispersed in water. In these products, solution polymers provide insufficient solvent resistance and adherence under repair conditions (30–60 min at 80°–90° C.) while emulsion polymers provide insufficient sweat box resistance (weather resistance) due to their emulsifiers, especially under drying conditions at low temperatures.

SUMMARY OF THE INVENTION

It is an object of this invention to provide aqueous coating compounds which give rise to coatings with good weather resistance combined with good optical and mechanical properties.

This problem is solved according to the invention by aqueous coating compounds based on binders containing polyurethane resin, characterised in that they contain, as binders, I. from 60 to 100% by weight of a mixture of
  A) from 5–95% by weight of one or more self-emulsifying polyurethane resins in aqueous dispersion having a number average molar mass (Mn) of from 30,000 to 300,000, obtainable from a water-dispersible polyurethane prepolymer containing carboxyl groups corresponding to an acid number of from 5 to 50 and having more than one free isocyanate group, preferably at least 1.8 free isocyanate groups, per molecule, by chain lengthening with water, and
  B) from 95 to 5% by weight of one or more acrylated polyesters and/or acrylated polyurethanes having an acid number of from 5 to 50 in aqueous dispersion and
II. from 0 to 40% by weight of one or more fully etherified amine-formaldehyde condensation resins and/or polyisocyanates,
the percentages by weight in each case being based on the solids contents.

DETAILED DESCRIPTION OF THE INVENTION

According to the invention, the binder system used preferably consists of
I. from 95–70% by weight of a mixture of
  A) from 20 to 60% by weight of a high molecular weight polyurethane dispersion chain lengthened with water and
  B) from 80 to 40% by weight of acrylated polyester and/or acrylated polyurethane resin as dispersion and
II. from 5. to 30% by weight of water-soluble and/or water-insoluble amine-formaldehyde resin and/or blocked polyisocyanate.

The substance used as component A) is a self-emulsifiable polyurethane dispersion, for example a polyurethane dispersion prepared by known processes as described e.g. in DE-A-1 495 745 and by D. Dieterich and H. Reiff in Angew. Makrom. Chem., 26 (1972), 85. The polyurethane dispersion is preferably anionic and preferably has an acid number of from 5 to 50, most preferably above 10 and below 30, in the unneutralised state, based on its solid content, and a hydroxyl number below 30, preferably below 10 and most preferably below 2. The self-emulsifiable urethane resin preferably has a glass transition temperature below the dispersing temperature. The average particle size is preferably from about 0.001 to about 1.0 µm. The dispersion may, for example, be prepared by the following process: A urethane prepolymer is first prepared by reacting a) one or more polyisocyanates, preferably diisocyanates,
b1) a polyether diol or polyester diol or a mixture thereof,
b2) optionallly one or more low molecular weight polyhydroxyl compounds (polyols) and
c) one or more dimethylol alkane carboxylic acids in an NCO/OH equivalent ratio of from 1.1:1–2.0:1, preferably from 1.1:1 to 1.9:1. The prepolymer may be prepared, for example, by a single stage or a multistage reaction, solvent-free or preferably in an organic solvent which is free from active hydrogen.

This preparation may be followed by chain-lengthening with water, for example in the organic phase, at a reaction temperature of, for example, from 30° to 95° C., preferably above 45° C. and below 80° C., the quantity of water used being, for example, from 0.5 to 3 mol, preferably above 0.7 mol, most preferably above 1 and below 2 mol per isocyanate group. The polymer thus obtained may be emulsified in a further quantity of water either after or during its neutralisation with an amine and the organic solvent may be distilled off if necessary.

The isocyanate group-containing urethane prepolymer may be prepared, for example, from polyhydric alcohols having a hydroxyl number of from 10 to 1800, preferably from 50 to 500, with excess polyisocyanates at temperatures of, for example, up to 150° C., preferably from 50° to 130° C., solvent-free or in organic solvents which cannot react with isocyanates. The equivalent ratio of NCO to OH groups is from 1.1:1 to 1.9:1, preferably from 1.2:1 to 1.4:1. The polyols used for the preparation of the prepolymer may be of low molecular weight and/or high molecular weight. They may also contain anionic groups which are relatively inactive.

Low molecular weight polyols give rise to harder polyurethanes than higher molecular weight polyols. Low molecular weight polyols have a molecular weight of from 60 to about 400 and may contain aliphatic, alicyclic or aromatic groups. They are used in quantities of up to 30% by weight of the total quantity of polyols, preferably about 2 to 20% by weight. The low molecular weight polyols preferably have up to about 20 carbon atoms per molecule, such as ethylene glycol, diethylene glycol, triethylene glycol, 1,2-propanediol, 1,3-propanediol, 1,4-butanediol, 1,2-butyleneglycol, 1,6-hexanediol, 1,2-cyclohexanediol, 1,4-cyclohexanedimethanol, bisphenol A, bisphenol F, neopentylglycol, hydroxypivalic acid neophenyl glycol ester, hydroxyethylated or hydroxypropylated bisphenol A, hydrogenated bisphenol A and mixtures thereof. Urethane diols obtained by the reaction of alkylene carbonates such as ethylene or propylene carbonate with primary amino alcohols such as aminoethanol or aminoisopropanol or with primary diamines such as ethylene diamine, propylene diamine, 2-methyl-pentane diamine-(1,5) or hexane diamine-(1,6) may also be used.

Small quantities of dihydric alcohol may be replaced by trihydric alcohols such as glycerol, trimethylolethane or trimethylol propane for preparing branched polyurethane dispersions but low molecular weight reaction products with alkylene oxides may also be used.

To obtain an isocyanate prepolymer with high flexibility, a high proportion of one or more relatively high molecular weight, predominantly linear polyols preferably having a hydroxyl number of from 30 to 150 is added. These polyols are preferably polyethers and/or polyesters. Preferably up to 97% by weight of the whole quantity of polyol consists of saturated and unsaturated polyesters and/or polyethers having a number average molar mass Mn of from 400 to 5000.

Examples of high molecular weight polyols include aliphatic polyether diols corresponding to the following general formula

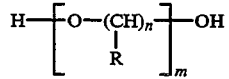

wherein R=hydrogen or a lower alkyl group optionally carrying several substituents, and n=2 to 6, preferably 3 to 4 and m=2 to 100, preferably 5 to 50. Examples include linear and branched polyether diols such as poly(oxyethylene)glycols, poly(oxypropylene)glycols and/or poly(oxybutylene)glycols. The selected polyether diols should not introduce an excessive quantity of ether groups as these would cause the resulting polymers to swell in water. The preferred polyether diols are poly(oxypropylene) glycols in the molar mass range Mn of from 400 to 3000.

Suitable polyester polyols may be prepared by various methods, for example solvent-free or by azeotropic condensation at temperatures e.g. of 160° to 260° C. They are preferably prepared from dicarboxylic acids and dihydric alcohols which may be slightly modified with small quantities of trihydric alcohols. The reaction is continued, optionally with the addition of catalysts such as tin octoate or dibutyl tin oxide, until virtually all the carboxyl groups have reacted (acid number below 1). The OH number is preferably from 35 to 200, most preferably above 50 and below 150. The number average molar mass is preferably from 500 to 5000, most preferably above 600 and below 3000, and depends on the alcohol excess employed. To determine the theoretical molar mass it is sufficient to determine the OH number, taking into account the functionality of 2 if the structure is linear. The number average molar mass is then calculated from the formula $$Mn = \frac{56100}{OH\ number} \times 2.$$

The preferred dicarboxylic acids, their anhydrides or methyl esters are linear or branched, aliphatic, alicyclic or aromatic. The two carboxyl groups are preferably so arranged that they cannot form an internal molecular anhydride, i.e. the two carboxyl groups should be separated, e.g. by a carbon chain having 2 to 14 carbon atoms, preferably 4 to 8 carbon atoms. Examples are: Adipic acid, 2,2,4-trimethyladipic acid, azelaic acid, sebacic acid, 1,3- and 1,4-cyclohexane dicarboxylic acid, 1,4- or 1,3-di- or tetrahydrophthalic acid, isophthalic acid, isophthalic acids substituted with alkyl groups, and/or terephthalic acid.

The dialkanols also have a linear or branched aliphatic or cyclic structure. Their two OH groups are also separated, e.g. by a carbon chain having 2 to 14, preferably 4 to 8 carbon atoms. Diols having sterically hindered primary OH groups or secondary hydroxyl groups are used for producing polyesters which are exceptionally resistant to hydrolysis. The following are examples of dialkanols: Butane-1,4-diol, hexane-1,6-diol, hexane-2,5-diol, cyclohexane-1,4-diol, 2-ethylhexane-1,3-diol, 2,2,4-trimethylpentane-1,3-diol, hydroxypivalic acid neopentyl glycol ester, cyclohexane dimethanol, 2,2-dimethyl-1,3-propanediol, 2-ethyl-2-butyl-1,3-propanediol, 1,1-isopropylidenebis(p-phenoxy)-1-ethanol, 2,2-bis-(hydroxymethyl)-1-butanol, 1,3-di-(hydroxyethyl)-5,5-dimethylhydantoin and the hydrogenated bisphenols A or F. The dialcohols may contain small proportions of higher functional polyols such as glycerol or trimethylolpropane for introducing branching. The quantity of these should, however, be so small that no cross-linked products are formed. Low molecular weight triols having a molar mass of from 60 to 350 are added in a quantity of from 0 to 6% by weight, preferably from 0.5 to 4% by weight, based on the polyester polyol. The polyester polyols preferably have a straight chain aliphatic structure and may contain a proportion of an aromatic dicarboxylic acid and preferably carry an OH group at the end of the molecule. The polyester polyols have virtually no free carboxyl groups and are preferably free from olefinic double bonds.

The polyester polyols used according to the invention may also be polyester diols obtained by the condensation of hydroxycarboxylic acids. They are distinguished by recurrent polyester groups corresponding to the following formula

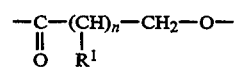

wherein n=3 to 18, preferably 4 to 6, and the substituent denoted by $R^1$ is hydrogen or an alkyl, cycloalkyl and/or alkoxy group. No substituent contains more than 12 carbon atoms. The basic units are, for example, hydroxycaproic acid, hydroxybutyric acid, hydroxydecanoic acid and/or hydroxystearic acid. A lactone corresponding to the following general formula

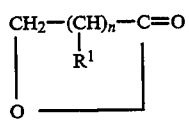

in which n and $R^1$ have the meanings indicated above may also be used as starting material. Unsubstituted E-caprolactones in which $n=4$ and $R^1=H$ and which are started with low molecular weight polyols are preferred for the preparation of polyester diols. The term "polyester diols free from carboxyl groups" also includes OH functional carbonic acid esters which may be prepared, for example, by the reaction of carbonic acid diethyl and/or diphenyl esters with glycols or dialkanols such as 1,6hexanediol.

Polydiols having a sequential structure obtained from polyethers and polyesters and normal carboxylic acid esters and carbonic acid esters may also be used. The polycarbonates may be modified as desired by highly polarizable groups in side chains or by the incorporation of aromatic or cyclic monomers.

Polyurethanes are generally not compatible with water unless special constituents are incorporated during their synthesis and/or special measures are carried out during their preparation. Thus in component A), such a large acid number is incorporated that the neutralised product can form a stable emulsion in water. Compounds containing two isocyanate reactive H groups and at least one group capable of anion formation are used for this purpose. Suitable isocyanate reactive H groups are in particular hydroxyl groups and primary and/or secondary amino groups. Carboxyl, sulphonic acid and/or phosphonic acid groups are examples of groups which are capable of anion formation. Carboxylic acid or carboxylate groups are preferably used. They should be so slow to react that the isocyanate groups of the diisocyanate preferentially react with the hydroxyl groups of the molecule.

Alkanoic acids which have two isocyanate reactive H groups and in which the carboxyl group is so sterically hindered that it does not react with isocyanate groups are preferably used for the preparation of such polyurethanes. Examples include alkanoic acids which have H-active groups and carry a bulky substituent or two substituents on the carbon atom which is in the alpha-position to the carboxyl group. The bulky substituents may be, for example, tertiary alkyl groups such as the tertiary butyl group. Other examples of suitable substituents are: Two methyl groups, two ethyl groups, etc. The H-active groups may be distributed in any desired positions over the basic structure of the alkanoic acids and/or the substituents. Alkanoic acids having two substituents on the carbon atom in the α-position are preferably used for this purpose. The substituent may be a hydroxyl group, an alkyl group or, preferably, an alkylol group. These polyols have at least one, generally 1 to 3 carboxyl groups in the molecule. They have from two to about 25, preferably from 3 to 10 carbon atoms. Dihydroxypropionic acid, dihydroxysuccinic acid, dihydroxybenzoic acid and/or dihydroxycyclohexane monocarboxylic acid are examples of such compounds. A particularly preferred group of dihydroxyalkanoic acids is formed by 2,2-dialkylol alkanoic acids which correspond to the following structural formula

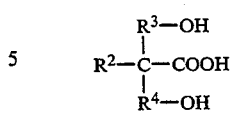

wherein $R^2$=hydrogen or an alkyl group having up to 20 carbon atoms; $R^3$ and $R^4$ denote, independently of one another, straight chain or branched $C_1$–$C_6$-alkylene chains, preferably $CH_2$. 2,2-Dimethylolacetic acid, 2,2-dimethylolpropionic acid, 2,2-dimethylolbutyric acid and 2,2dimethylolpentanoic acid are examples of such compounds. The preferred dihydroxyalkanoic acid is 2,2-dimethylolpropionic acid. The dihydroxyalkanoic acid is introduced into the mixture as diol in such a quantity that the acid number of the finished polyester urethane resin is from 5 to 50, for example from 10 to 50, preferably above 15 and below 40. The lower limit is most preferably at 20 and the upper limit most preferably at 30. Suitable compounds containing phosphoric acid groups are, for example, 2,2-dimethylolpropane phosphonic acid and diethanolamide methane phosphonic acid. These monomers which form anionic groups are added in such quantities that the acid number of the polyester urethane resin is within the desired range.

The dimethylolalkane carboxylic acid is used in a quantity of about 0.5 to about 5% by weight, preferably about 1 to 3% by weight (calculated as carboxyl group), based on the urethane prepolymer formed by the reaction of components (a) to (c). If the quantity of carboxyl groups is less than about 0.5% by weight, it is difficult to obtain a stable emulsion. If, on the other hand, the quantity exceeds 5% by weight, the hydrophilic property is increased so that the emulsion becomes highly viscous and the water resistance of the coating is reduced.

The following are examples of compounds containing amino groups: δ-Diaminovaleric acid, 3,4-diaminobenzoic acid, 2,4-diaminotoluene sulphonic acid and 2,4-diaminodiphenylether sulphonic acid. The typical polyisocyanates used, in particular diisocyanates, are, for example, straight chain or branched aliphatic, cycloaliphatic and/or aromatic hydrocarbons having an isocyanate content of from 20 to 50%. They preferably contain two isocyanate groups symmetrically or asymmetrically arranged in the molecule as functional groups. They may be aliphatic, allcyclic, arylaliphatic or aromatic. Their structure may be chosen, for example, according to the intended use of the coating compound which may, for example, be pigmented. For example, isomers or isomeric mixtures of organic diisocyanates of tolylene diisocyanate may be used if the end product is subsequently to be used as primer or stopping medium. Other examples include 1,4-bis(isocyanato)benzene, 2,4-bis-(isocyanato)-toluene, bis(isocyanato)-isododecylbenzene, bis(2-isocyanatophenyl)-methane, 1,5-bis-(isocyanato)naphthalene and 4,4-bis(isocyanato)-3,3-dimethyldiphenyl. When aromatic diisocyanates are used as component (a), the coating tends to yellow as it hardens and discolour when exposed to UV light; they are therefore undesirable. For top coat lacquer systems it is preferred, for example on account of their good resistance to ultraviolet light, to use diisocyanates in which the isocyanate group is attached to a non-aromatic, optionally substituted carbon atom. Examples of suitable aliphatic diisocyanates include those corresponding to the following general formula $$O=C=N-(CR_2^5)_m-N=C=O$$

wherein m denotes an integer from 2 to 20, in particular from 5 to 8, and the $R^5$'s, which may be identical or different, denote hydrogen or a lower alkyl group having 1 to 8 carbon atoms, preferably a methyl group. The following are examples of these compounds: 1,6-bis-(isocyanato)-pentane, 1,6-bis-(isocyanato)-hexane, 1,6-bis-(isocyanato)-2,2,4-trimethylhexane, 1,4-bis-(isocyanatoethyl)-cyclohexane and 1,3-bis-(2-isocyanatomethyl)cyclohexane. The following are examples of suitable cycloaliphatic diisocyanates: 1,4-Bis-(isocyanato)cyclohexane, bis-(4-isocyanato-cyclohexyl)-methane, 5-isocyanato-3-(isocyanatomethyl)-1,1,3-trimethylcyclohexane, lysine diisocyanate, tetramethylene xylylene diisocyanate and methane diisocyanate. The following, for example, are suitable arylaliphatic diisocyanates: 1,3-bis-(1-isocyanatomethyl)-benzene and 1,4-bis-(1-isocyanato-1-methyl)-benzene. Polyester urethane resins based on 5-isocyanato-3-(isocyanatomethyl)-1,1,3-trimethylcyclohexane (=isophorone diisocyanate) and/or bis(4-isocyanatocyclohexyl)-methane (=Desmodur W $(R)$) are particularly preferred as a mixture of different steric configurations. The synthesis is carried out by reacting all the components together as a mixture or stepwise to form a sequential structure. They may contain a small proportion of triisocyanates such as, for example, isocyanurates, polyisocyanate esters or reaction products of trimethylolpropane and diisocyanate.

Polyols and diisocyanates are preferably reacted in anhydrous inert solvents such as ketones, esters or ethers, e.g. at temperatures of from 40° to 100° C., for example in acetone, methylethyl ketone, methyl isobutyl ketone, N-methyl pyrrolidone, tetrahydrofuran, dioxane, diethylene glycol-dimethylether, propylene glycoldimethylether, methoxyhexanone and/or methoxypropyl acetate. The molar mass is controlled by the NCO/OH ratio and the resin is adjusted to the desired NCO number. It is then reacted with such a quantity of water, e.g. in the organic solvent, that the NCO number is virtually reduced to 0 and a resin viscosity of from 1 Pa.s to 20 KPa.s, measured on the solvent used and determined by means of a rotary viscosimeter, is obtained. This may be achieved, for example, by a reaction with 0.5 to 5 mol of water, preferably above 1 mol and below 3 mol of water, per equivalent of isocyanate groups. Expressed as a percentage by weight, the quantity of water used may be, for example, less than 1% by weight of water, based on the total polymerisation mass. The reaction with water is preferably carried out before neutralisation as the formation of unwanted coagulate can thereby be prevented. This is followed by the preparation of an aqueous dispersion, in particular one having a solids content of from 20 to 50% by weight, by further dilution with water, a base, e.g. ammonia, alkylamine or an amino alcohol, being added before, during or after the addition of water in order to neutralise the carboxyl groups. The degree of neutralisation is from 0.5 to 1.2 equivalents of amine per carboxyl group, preferably 100%. The amines used are primary, secondary or tertiary alkylamines or amino alcohols such as diethylamine, triethylamine, N-methylmorpholine, dimethylaminoethanol, diisopropanolamine, aminoethanol, etc. The organic solvent may then be removed, e.g. by suitable distillation optionally under vacuum, e.g. at temperatures of from 40° to 90° C. The dispersions obtained have an average particle size of from 10 to 1000 nm, preferably from 30 to 500 nm.

Component B) of the coating compounds according to the invention is formed as an aqueous dispersion from acrylated polyesters and/or acrylated polyurethanes. The dispersions obtained have an average particle size of from 10 to 1000 nm, preferably from 30 to 500 nm.

Acrylated polyesters are defined, as described e.g. in DE-A-28 11 913, DE-A-33 01 729 and DE-A-35 44 337, as reaction products which may be prepared by radical emulsion polymerisation of copolymerisable α,β-unsaturated monomers in the presence of straight chain or branched carboxyfunctional polyesters which may contain urethane, amide, hydroxyl and/or epoxy groups. The preparation may be carried out, for example, at temperatures from 0° to 150° C., preferably above 20° and below 100° C., most preferably above 40° and below 90° C., with the addition of at least one polymerisation initiator, optionally under pressure. Suitable polyesters may be obtained, for example either solvent-free or by the azeotropic condensation process, by reacting the polycarboxylic acids and polyhydric alcohols at temperatures from 150° to 260° C., optionally with the addition of saturated or unsaturated fatty acids (oils) and/or epoxide compounds. Their acid number is such that they can form stable dispersions in water after neutralisation.

The polycarboxylic acids used are straight chain or branched aliphatic, cycloaliphatic and/or aromatic polybasic carboxylic acids, preferably di-, tri- or tetra-carboxylic acids having 4 to 12 carbon atoms per molecule or their esterifiable derivatives, for example their anhydrides or methanolic esters. Apart from the dicarboxylic acids already mentioned in connection with the polyester polyols which are used for the preparation of the polyurethane resins of component A), the carboxylic acids used may be, for example, the products of addition of (meth)acrylic acid to conjugated or isolated unsaturated fatty acids, phthalic acid anhydride or tetrahydrophthalic acid anhydride or tricarboxylic acids such as trimellitic acid anhydride or products of addition of maleic acid to isolated or conjugated unsaturated fatty acids or tetracarboxylic acids such as pyromellitic acid dianhydride or bis-anhydrides prepared from trimellitic acid anhydride and dialkanols. The optionally oil-free polyesters advantageously also contain small quantities of monobasic acids such as benzoic acid, tert.-butyl benzoic acid or abietic acid for adjusting the functionality and hardness, but carboxylic acids containing hydroxyl groups, such as 5-hydroxypentanoic carboxylic acid or its lactone, dimethylolpropionic acid, salicylic acid, tartaric acid or cyclohexanol monocarboxylic acid may also be incorporated by esterification.

The polyhydric alcohols used are preferably straight chain or branched aliphatic, cycloaliphatic and/or araliphatic alcohols having 2 to 6, preferably 2 to 4 hydroxyl groups which are attached to non-aromatic carbon atoms and 2 to 4 carbon atoms per molecule. Examples of such polyalcohols include glycols and dialkanols such as those already used for the polyester polyols of the polyurethane resins of component A). Trihydric and higher hydric polyalcohols such as glycerol, trimethylolpropane, di- or trimethylol propane ether, trimethylolethane, pentaerythritol, di-pentaerythritol, 1,2,6-hexanetriol or tris-hydroxyethylisocyanurate may be used for increasing the functionality and introducing branching. Small quantities of the aforesaid polyhydric alcohols may be replaced by monohydric alcohols. The choice of alcohol components depends inter alia on the desired free hydroxyl group content, the quantity of monocarboxylic acid used and the desired solubility and dilutability. The polyesters used may be partly urethanised with mono- or diisocyanates.

The required solubility in water may be obtained by stopping the preparation of the resins at the appropriate degree of condensation or preferably by reacting a relatively high molecular weight, OH group-containing polyester with acid anhydrides, preferably cycloaliphatic acid anhydrides. A similar effect may be obtained by a reaction with bis-anhydrides, trimellitic acid anhydride, trimellitic acid monoalkyl esters or products of addition of maleic acid anhydride to isolated or conjugated unsaturated fatty acids. Another advantageous procedure is that of lowering the acid number of a highly acid polyester precondensate by at least partial reaction with compounds containing epoxide groups, such as the glycidyl ester of versatic acid (Cardura$^R$ E-10), epoxidised linseed oil or soya bean oil or polyglycidyl ethers. The OH polymer used is preferably a reaction product having an average molar mass (Mn) of from 2000 to 100,000 (gel chromatography against polystyrene standard) and a preferred acid number of from 5 to 150, based on the solids content of the resin, of a) a polyester or a copolymer having a hydroxyl number of from 20 to 300, in particular above 40 and below 200, especially above 50 and below 130, based on the solid resin, b) a polycarboxylic acid anhydride mixture containing trimellitic acid units and having an acid number of from 10 to 1000, preferably above 100 and below 800, which is prepared by the reaction of trimellitic acid anhydride with, preferably, dihydric alcohols, and c) epoxidised oils having epoxy numbers of from 1 to 50, preferably above 2 and below 25, especially above 3 and below 15, the equivalent ratio of carboxyl groups to epoxide groups being from 3:1 to 1:3, preferably from 1.25 : 1 to 1:1.25 and the solids content ratio of bisanhydride (b) to OH polymer (a) being from 50:50 to 10:90, preferably from 40:60 to 15:85.

The polyester thus prepared is preferably converted after neutralisation into an aqueous dispersion in which a mixture of unsaturated monomers is polymerised. To prepare the aqueous dispersion, the polyester is diluted with water, a base such as ammonia, alkylamine or an amino alcohol being added during, after or preferably before the addition of water to neutralise the carboxyl groups. The degree of neutralisation may be, for example, from 0.5 to 1.2 equivalents of amine per carboxyl group, preferably 100%. The amines used are primary, secondary or tertiary alkylamines or amino alcohols such as diethylamine, triethylamine, N-methylmorpholine, dimethylaminoethanol, diisopropanolamine, aminoethanol, etc. For obtaining the best conditions for emulsion polymerisation, additional quantities of water may be introduced while polymerisation is in progress.

The $\alpha,\beta$-unsaturated monomers chosen may be virtually any radically polymerisable monomers but due consideration must be taken of the usual restrictions for copolymerisations as prescribed by the Q and e scheme of Alfrey and Price and the copolymerisation parameters. The unsaturated monomers which contain no further reactive groups are chosen on the basis of the mechanical properties and the compatibility of the polymers. Hydrophilic monomers may be used for carrying out the polymerisation but are generally not necessary. For example, acrylic acid alkyl esters, methacrylic acid alkyl esters and/or dialkyl esters of maleic or fumaric acid are used, the alkyl groups having 1 to 20 carbon atoms and being arranged in straight or branched aliphatic chains and/or as cycloaliphatic and/or (alkyl-)aromatic radicals. So called hard monomers with a high glass transition temperature suitable for use as homopolymers are, for example, the isomers of aromatic vinyl type monomers such as styrene, methylstyrene, vinyl toluene, p-tert.-butylstyrene or methacrylic acid esters having a short aliphatic chain, such as methyl methacrylate or ethyl methacrylate, but also cyclohexyl methacrylate, isobornyl methacrylate, dihydrodicyclopentadienyl methacrylate, (meth) acrylamide and/or (meth)acrylonitrile. Suitable soft monomers, on the other hand, are: Acrylic acid esters having a long alcohol chain, such as n-butylacrylate, isobutylacrylate, tert.-butylacrylate, 2-ethylhexylacrylate and/or lauryl acrylate. Unsaturated ethers such as ethoxyethyl methacrylate or tetrahydrofurfuryl acrylate may also be used. A proportion of monomers of the vinyl ester type, preferably vinyl esters of branched $C_5$ to $C_{15}$ monocarboxylic acids, most preferably vinyl esters of versatic acid, may also be used if suitable reaction conditions are observed. By hydroxyl group-containing monomers which can be incorporated by polymerisation are meant, for example, monomers which contain at least one OH group on a straight chain or branched aliphatic or cycloaliphatic $C_2$ to $C_{20}$ carbon structure in addition to an ethylenically unsaturated group. Particularly suitable are (meth)acrylic acid hydroxyalkyl esters such as hydroxyethyl acrylate, 2-hydroxypropyl methacrylate, butane-1,4-diol monoacrylate, propylene glycol monoacrylate, 2,3-dihydroxypropylmethacrylate and polypropylene glycol monoacrylate as well as fumaric acid dihydroxyalkylesters- N-hydroxyalkyl (meth)-acrylamides and N-hydroxyalkyl-fumaric acid mono-or diamides such as N-hydroxyethylacrylamide or N-(2-hydroxypropyl)-methacrylamide may also be used. Particularly elastic properties may be obtained by using a reactionproduct of hydroxyalkyl(meth)acrylate and $\epsilon$-caprolactone. Ethylenically polyunsaturated monomers having at least two radically polymerising double bonds may also be used in small quantities, e.g. divinylbenzene, 1,6-hexanediol-diacrylate or the reaction product of diisocyanate and hydroxyalkyl (meth)acrylates.

Polymers which are initially dispersible in water and are subsequently converted into the cross-linked state by a suitable heat treatment after they have been applied to a substrate may be obtained by the incorporation of from 0 to 60% by weight, preferably above 0.5 and below 40% by weight, of thermally reactive vinyl monomers. Unsaturated monomers containing groups suitable for cross-linking are those containing a) epoxide groups such as glycidyl (meth)acrylate or alkylglycidyl (meth) acrylate, glycidyl or alkylglycidyl (meth)acrylamide or alkylglycidyl ether;

b) blocked isocyanate groups as, for example, in isocyanatoethyl (meth) acrylate blocked with caprolactam or ketoxime, 1- (4-isopropenylphenyl) -1-methylisocyanate or (1-alkenyl)isocyanate;

c) N-alkoxyalkylamides as in methoxy- or ethoxymethyl (meth)acrylamide or the corresponding compounds of other ethylenically unsaturated acids such as maleic, fumaric, itaconic or crotonic acid; and/or d) carboxyl groups such as (meth)acrylic acid, maleic acid, fumaric acid or their semi-esters or semi-amides.

The use of glycidyl methacrylate and methacrylic acid may, for example, automatically give rise to the corresponding glycidyl dimethacrylate when polymerisation takes place. Preferred dispersion copolymers may contain monomer units consisting to an extent of up to 100% by weight of methyl methacrylate and/or n-butylacrylate, from 0 to 20% by weight of hydroxyethyl methacrylate, from 0 to 20% by weight of glycidyl methacrylate and from 0 to 20% by weight of (meth)acrylic acid, the percentages of monomer units always adding up to 100. A mixture in which the ratio of monomer units is from 15 to 80% by weight of methyl methacrylate, from 15 to 50% by weight of n-butylacrylate, from 0 to 15% by weight of glycidyl methacrylate and from 0 to 5% by weight of (meth)acrylic acid is particularly preferred.

The dispersion may be prepared, for example, by introducing the polyester as a 5 to 65% by weight aqueous system into the reaction vessel and then polymerising the vinyl monomers with the addition of a polymerisation initiator and optionally other conventional additives such as emulsifiers and/or protective colloids and/or molecular weight regulators. Copolymerisation is preferably carried out with from 5 to 95% by weight of the carboxyl group-containing and OH-group-containing polycondensate and from 95 to 5% by weight of $\alpha,\beta$-unsaturated monomers, based on the total solids content of the finished resin.

The carboxyfunctional polycondensate is preferably used in a quantity of more than 10% by weight, especially more than 25% by weight, and the monomers preferably in a quantity of less than 90% by weight, especially less than 75% by weight, the percentages of the two components adding up to 100. Polymerisation may be carried out by introducing the neutralised carboxyfunctional polymer into the reaction vessel together with the total quantity of water as an aqueous system and part of the initiator, heating the reaction mixture up to the required polymerisation temperature and then slowly adding the monomer mixture together with the remainder of the initiator within 30 to 180 minutes. Alternatively, part of the water may be introduced into the reaction vessel together with the carboxyfunctional polymer and a pre-emulsion may be prepared from the remainder of the water, the remainder of the carboxyl group-containing polymer and the vinyl monomers, this pre-emulsion being then slowly introduced into the contents of the reaction vessel which have been preheated to the polymerisation temperature and contain a polymerisation initiator. When all the components have been introduced, the whole reaction mixture is stirred for 1 to 2 hours at 60° to 90° C., preferably at 70° to 85° C., optionally with the addition of a further quantity of initiator, to ensure complete conversion. The solids content of the polymer dispersions obtained is generally from 5 to 75% by weight, preferably from 10 to 65% by weight. The number average molar mass Mn of the polymer obtained is generally from 10,000 to 5 million, preferably from 50,000 to 1 million, based on polystyrene standard and determined by gel permeation chromatography.

The radical forming initiators used may be, for example, percarbonates, peresters such as tert.-butylperpivalate, tert.-butylperoctoate or tert.-butylperbenzoate, peroxides such as benzoyl peroxide, o-methoxybenzoyl peroxide or dichlorobenzyl peroxide, hydroperoxides such as tert.-butyl hydroperoxide or cumene hydroperoxide or aliphatic azo compounds such as azodiisobutyric acid nitrile. The initiator may be water soluble or soluble in monomers. Preferred initiators are, for example, sodium, potassium or ammonium peroxydisulphate and sodium, potassium or ammonium peroxydisulphate redox systems with sodium, potassium or ammonium sulphides or sulphites or other reducing agents. The quantity of polymerisation initiator is generally from 0.01 to 10% by weight, preferably from 0.02 to 5% by weight, in particular from 0.05 to 3% by weight, based on the total quantity of the vinyl monomers. The molar mass of the polymers may be lowered in known manner by means of molecular weight regulators such as mercaptans, halogenated compounds and other radical transmitting substances. Butyl mercaptan, dodecyl mercaptan, tetrakis-mercaptoacetyl pentaerythritol, tert.-butyl-o-thiocresol, chloroform, bromoform, trichloroethylene, trichlorobromomethane, carbon tetrachloride, toluene, dimerised $\alpha$-methylstyrene and/or 3-oxatetrahydrofuran are preferred for this purpose. Mixtures of from 95 to 10% by weight of acylated polyester and 5 to 90% by weight of polyurethane dispersion containing urea groups are used for producing a good water-dilutable metallic base coat.

Water dilutable, high molecular weight, emulsion type acrylated polyurethanes may be used as component B) in the aqueous coating compounds according to the invention instead of or in addition to the acrylated polyesters. By acrylated polyurethanes are meant, for example, reaction products which have been prepared by radical solution, emulsion or suspension polymerisation of copolymerisable $\alpha,\beta$-unsaturated monomers in the presence of optionally unsaturated polyurethane resins, e.g. as described in DE-A-4 122 265 and DE-A-4 122 266. The preparation of a stable dispersion depends on the acid number of the polyurethane dispersion ($SZ_{(PU)}$) and the proportion of monomers in accordance with the following formula:

$$SZ_{(PU)} = \frac{SZ_{(end\ product)} \times 100}{100 - \%\ monomer}.$$

The acid number of the acrylated polyurethane dispersion ($SZ_{(end\ product)}$) is preferably from 12 to 40. The hydroxyl number optionally present is introduced by means of unsaturated monomers containing hydroxyl groups. It is preferably from 5 to 100; the lower limit is advantageously 20 and the upper limit 80. To prepare the acrylated polyurethane resin, from 95 to 5% by weight of polyurethane resin are used with 5 to 95% by weight of unsaturated monomers. The quantity of polyurethane resin used is preferably less than 60% by weight, most preferably less than 50% by weight, and at least 20% by weight, preferably at least 30% by weight, based on the total solids content of resin. The aqueous polyurethane dispersions may be prepared, as described above for component A), from the raw materials mentioned there. If chain lengthening is desired, this may be carried out as described above or by the conventional method with polyamines. Emulsifiers are generally not employed. Polymerisation of the monomers is carried out in the same manner as the preparation of acrylated polyesters already described. The main difference lies in the use of a carboxyl group-containing polyurethane dispersion instead of the carboxyl group-containing polyester for the graft polymerisation. To assist grafting, the dispersions used may still contain unsaturated groups in the polyurethane resin, in particular as a result of the introduction of unsaturated carboxylic acids such as maleic acid or fumaric acid or unsaturated fatty acids into the polyester or by means of unsaturated monomers such as hydroxyalkyl(meth) acrylates which defunctionalise higher valent polyisocyanates to diisocyanates. The unsaturated monomers used are preferably mixtures of from 16 to 100% by weight, more preferably from 20 to 90% by weight, in particular from 35 to 85% by weight of ethylenically unsaturated monomers which contain no reactive groups apart from the unsaturated bond and from 0 to 65% by weight, preferably from 10 to 60% by weight, in particular from 15 to 50% by weight of hydroxyl group-containing monomers which can be incorporated by polymerisation and from 0 to 7% by weight of monomers preferably not including polyunsaturated monomers. Examples of suitable monomers have already been given in the description of the acrylated polyesters.

To prepare the aqueous dispersion, the radically polymerisable, ethylenically unsaturated monomers may be slowly added to the heated aqueous dispersion of the polyurethane resin. The monomer may be added all at once or only a part may be introduced initially, the remainder being added subsequently in the course of the reaction. The monomers may, however, also advantageously be converted into a pre-emulsion with water and part of the polyurethane dispersion, and this pre-emulsion may then be slowly added to the remainder of the polyurethane dispersion. The radical initiators used are preferably water-insoluble organic initiators which are either introduced into the reaction mixture already in the reaction vessel or added dropwise together with the monomers. On the other hand, a proportion of the monomers may be added at a different concentration to the reaction mixture in the vessel already containing part of the monomers. The remainder of the initiators is then added with the remainder of the monomers. Radical initiation is carried out by thermal decomposition of organic peroxides such as tert.-butylperoctoate or with azo compounds such as azo-bis-isobutyronitrile. The reaction temperature depends on the speed of decomposition of the initiator and may be lowered by means of suitable redox systems if necessary. Polymerisation is generally carried out at a temperature of from 30° to 100° C., in particular at 60° to 95° C. The temperature may be raised to 130° C. if a pressure of up to about 10 bar is employed.

The aqueous coating compounds according to the invention may contain component II (also referred to as component C) to complete the binder. This component consists of one or more formaldehyde condensation resins and/or blocked polyisocyanates. The formaldehyde condensation resins used may be, for example, the amine formaldehyde or phenol formaldehyde condensation resins well known in the art, such as fully etherified amine formaldehyde and phenol formaldehyde resins. Component II serves as hardener or, especially in the case of amine formaldehyde condensation resins, also for improving the use properties of the product.

The amine formaldehyde condensation resins used may be resins well known in the art. They are obtained, for example, by the reaction of aldehydes with urea, N-alkylurea, glycoluril, dicyandiamide or various triazines such as melamine, benzoguanamine or acetoguanamine or mixtures thereof, and this reaction is preferably followed by complete etherification with low molecular weight monohydric alcohols. The resins obtained vary in their molar mass and reactivity according to the reaction conditions employed (pH value, temperature) and the degree of methylolation. The aldehyde used is preferably formaldehyde in aqueous and/or alcoholic form as a hemiacetate. Paraformaldehyde is readily hydrolysed or depolymerised in the presence of dilute acids or bases in hot water or alcohols. Other aldehydes may also be used, such as glyoxal, acetaldehyde, isobutyraldehyde or furfural. It is generally preferred to carry out the methylolation with formaldehyde with the addition of weak bases. From 3 to 6 methylol groups are advantageously reacted per molecule of melamine.

The methylol groups of the aldehyde condensation products are preferably completely reacted with monohydric alcohols, using acid catalysis. Methanol, ethanol, propanol, butanol, heptanol, benzyl alcohol, cyclic alcohols, ethoxyethanol and butoxyethanol are particularly preferred.

If alcohols having more than 4 carbon atoms are to be incorporated, the methylol group is first etherified with a lower alcohol and the higher alcohol is subsequently introduced by transetherification. The preferred alcohols are methanol and butanol and its monomers. Particularly preferred are melamine resins which have been reacted with 3 to 6 mol of formaldehyde and subsequently completely etherified with methanol or with methanol and n- or isobutanol. The resins are prepared in accordance with the state of the art and are available on the market from many suppliers. When etherification is carried out with hydroxy carboxylic acids such as hydroxybenzoic acid, salicylic acid or dimethylolpropionic acid, the melamine resins obtained contain carboxyl groups whereas hydroxyalkyl (meth)acrylates and allyl alcohol give rise to unsaturated melamine resins. Carbamyl-methylated melamine resins prepared by the reaction of alkoxymethylated melamine resins with alkylcarbamates under weak acid conditions may also be used.

The preferred melamine or benzoguanamine resins used may be hydrophobic or hydrophilic, depending on their chemical structure, a hydrophobic structure being preferred. This depends on the resin having a number average molar mass of about 600 to 4000, preferably above 1000 and below 3000, and on its dilutability in solvents (compatible with petroleum hydrocarbons).

The polyisocyanates for component II are preferably blocked polyisocyanates. These may be prepared from the diisocyanates described above for components A) and B). The functionality of these diisocyanates is advantageously increased by a reaction with water or trimethylolpropane or by trimerisation.

Polyisocyanate esters are produced, for example, by the reaction of silylated polyhydric alcohols such as pentaerythritol with isocyanatocarboxylic acid chlorides.

The free isocyanate groups of component II are masked (blocked) together or singly so that they may be protected at room temperature against reactions with water or the active hydrogen atoms of the basic resin (hydroxyl groups). The blocking agents used may be monofunctional compounds containing acidic hydrogen and having only a single amine, amide, imide, lactam, thio or hydroxyl group. Volatile compounds containing active hydrogen and having a low molar mass, preferably not above 300, more preferably not above 200, are generally employed.

They are advantageously reacted with the isocyanate groups at temperatures above 50° C., preferably at 80° to 120° C.

The blocking agent is used in the quantities required to provide one equivalent of blocking agent to one isocyanate equivalent; conventional catalysts, for example basic catalysts such as tertiary amines or small quantities of metal salts such as tin-(II)-octoate or dibutyl tin dilaurate may be used for this reaction. Examples of suitable blocking agents include secondary and tertiary aliphatic and cycloaliphatic alcohols such as isopropanol, tert.-butanol, 2-ethylhexanol, furfurol and cyclohexanol and hydroxyalkyl esters, dialkylaminoalcohols such as dimethylaminoethanol, oximes such as formaldehyde oxime, acetaldehyde oxime, methyl ethyl ketone oxime, cyclohexanone oxime, trimethylcyclohexanone oxime, 2,2,6,6-tetramethyl-piperidone-(4) oxime, acetophenone oxime, benzophenone oxime and diethylglyoxime, lactams such as ε-caprolactam, δ-valerolactam, and γ-butyrolactam, pyrrolidone-2, hydroxamic acids such as acetohydroxamic acid or benzohydroxamic acid or esters thereof, phenols such as phenol, cresol, tert.-butylphenol or dimethylaminophenol, N-alkylamides such as methylacetamide, imidazoles such as 2-methylimidazole, imides such as phthalimide or N-hydroxymaleiimide, and enolising compounds such as malonic acid esters, acetoacetic acid esters and NH functional enamines.

β-Hydroxyglycols or -glycol ethers and glycolamides are also suitable. Oximes and lactones are of particular interest as masking agents because the polyisocyanates masked with these compounds react at relatively low temperatures. More than one type of protective group may be used for blocking, preferably groups differing in their reactivity. For example, a mixture of two or more differently blocked polyisocyanates may be used or a polyisocyanate blocked with two or more different protective groups may be used.

Particularly preferred blocking agents for the process according to the invention are compounds corresponding to the formula

X - H in which X stands for

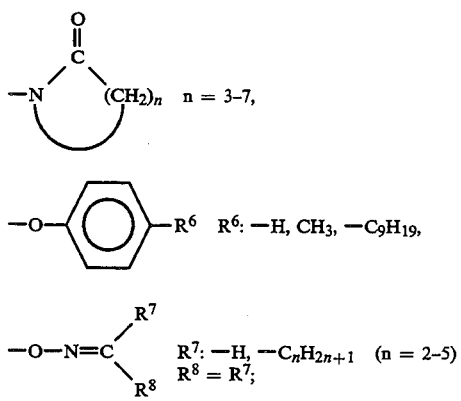

$R^8$ and $R^7$ may be identical or different, or

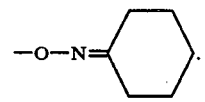

ε-Caprolactam and methylethyl ketoxime are preferred example.

The blocking reaction is generally carried out by introducing the isocyanate component into the reaction vessel and then adding the other reactants. The reaction may be carried out solvent-free or in the presence of suitable (inert) solvents.

Crosslinking of the water-dilutable basic resins with blocked polyisocyanates may be accelerated by the addition of from 0.01 to 2% by weight, especially from 0.5 to 1% by weight, based on the resin solids content, of catalysts such as strongly basic tertiary amines, e.g. triethylene diamine, and/or active metal compounds. A special, sometimes synergistic effect is obtained by a combination of basic medium of the separated resins and the metal salts of bismuth, lead, cobalt, iron, antimony, mercury, calcium, zinc and tin and/or tin-II and tin-IV compounds. Catalysts such as iron-III-acetylacetonate, zinc acetylacetonate, dibutyl tin dilaurate, di-n-butyl tin oxide, dibutyl tin dioctyl maleate, tin octoate, tin oleate, tetrabutyl titanate and/or cobalt-2-ethylhexanoate are particularly preferred. Catalysts which are present in a finely divided form in the aqueous bath and do not impair levelling in the film are preferred.

The melamine resins and blocked polyisocyanates act as cross-linking agents or as plasticizers in the coating compounds according to the invention, depending on their reactivity or reaction temperature. Hydrophobic melamine resins optionally mixed with blocked polyisocyanates are preferred.

The aqueous coating composition according to the invention preferably contains components I) to II) in the ratios indicated below, based in each case on the resin solids content by weight.

The solids content and the viscosity may be adjusted immediately before use to the conditions of application.

The ratio of the mixture of components A) and B)/component II is preferably from 95/5 to 60/40, in particular from 90/10 to 65/35, when the aqueous coating composition is to be applied to metal substrates and preferably from 90/10 to 20/80, in particular from 80/20 to 30/70, when applied to synthetic resin substrates.

The water content of the coating compounds according to the invention depends on the form in which the coating compounds are marketed and/or applied.

It may be, for example, from 40 to 85% by weight or more, based on the total binder content. The water content may, for example, amount to 50% by weight on delivery and may be increased before application to the value required for processing. The solids content or stoving residue depends on the use of the product. It may, for example, be about 15 to 25% by weight in metallic base coats and about 20 to 50% by weight in unibase coats.

The coating compounds according to the invention may contain from 1 to 20% by weight, preferably from 8 to 15% by weight, of one or more solvents, based on the whole coating compound, for improving the flow properties. The solvents may be organic solvents such as those conventionally used as lacquer solvents in the field of lacquers and/or as additives for aqueous coating compounds. Suitable solvents are, for example, aliphatic or aromatic solvents such as petroleum hydrocarbons or xylene, esters such as butyl acetate, ethers such as ethylene glycol monobutylether (butyl glycol) or propylene glycol monoethylether and alcohols such as n-butanol.

The coating compounds according to the invention contain neutralising agents for partial or complete neutralisation of neutralisable groups. The degree of neutralisation of the neutralisable groups may advantageously be from 40 to 120% of these groups and is preferably below 100%. The neutralising agents for acid groups may be the usual bases used for lacquers, such as the above-mentioned amines or ammonia or alkanolamines such as N,N-dimethylethanolamine.

The binders are particularly suitable for the production of coating compounds for colour producing basic coats but they may also be used for the production of other coating compounds, e.g. primers, fillers or coats for protecting against stone chipping. The choice of pigments and additives and their concentration is adapted to the particular purpose for which the binders are to be used.

The aqueous coating compounds according to the invention may contain metallic and/or colouring pigments as conventionally used for coating compositions. Suitable effect pigments include e.g. aluminium pigments, interference pigments (various metal oxides or combinations thereof on mica), organically coated interference pigments, graphite platelets, phthalocyanine platelets, iron oxide platelets, aluminium pigments coated with iron oxide, molybdenum sulphide platelets, special steel platelets and glass flakes. Conventional organic or inorganic transparent or covering pigments may suitably be used as colouring pigments.

Both covering and transparent pigments and/or dyestuffs may be ground up or incorporated in the basic binder (component I and/or II) in a suitable pasting resin as described e.g. in EP-A-0 438 090 or e.g. in a melamine resin for producing coloured metal effects or unicolour shades. The conventional procedure may be employed for this purpose. The colouring agents used for producing coloured pastes or toning pastes may be, for example, pigments of the type described in German standard DIN 55 944. Suitable pigments for this purpose include inorganic pigments such as titanium dioxide, carbon black, iron oxides, chromium oxides or lead chromate and/or organic pigments such as phthalocyanines, quinacridones, perylenes, indanthrenes or isoindolines and/or halogenated thioindigo pigments as well fillers such as silica, barium sulphate, talc or laminated silicates. The apparatus used for dispersion may be stirrer disc apparatus, three-roll mills, ball mills or, preferably, sand or pearl mills. The optimum composition of grinding stock is obtained from a suitable combination of the main components of the stock, i.e. pigments, binders and solvents (water) and must be determined separately for each dispersing apparatus. It is the function of the dispersing process to break up pigment agglomerates as far as possible into individual particles to enable them to produce their full optical effect. For this purpose, the grinding stock must contain at least sufficient binder for complete wetting of the pigment. It is generally advantageous to operate at as high a concentration as possible in order to introduce as little pasting resin into the subsequent lacquer formulation as possible. The viscosity range should be chosen to enable the material to be workable and enable complete dispersion to be achieved in the shortest possible time. The optimum composition of the grinding stock is adjusted to the given pigment. Pigment pastes generally have a structurally viscous rheology. The grinding stock may be diluted with further quantities of aqueous binder dispersion before grinding in order to facilitate adjustment of the colour shade.

The usual auxiliary agents such as antifoamants and dispersing aids may be added to the grinding stock. To ensure perfect wetting of the surface of the pigments it may be advantageous but is not necessary also to add to the grinding stock a dispersing agent (wetting agent) which is adsorbed by the surface of the pigments and assists the wetting process by lowering the surface tension between pigment and binder. Conventional wetting agents, for example, are suitable for this purpose. Metallic or non-metallic effect pigments such as aluminium bronzes, pearly lustre pigments or interference pigments are generally wetted in a separate operation and subsequently stirred into the ground colour producing, transparent pigment paste without great shearing stress.

The coating compounds according to the invention may contain conventional additives and auxiliary agents used in the field of lacquers. These include thickeners, additives which influence the flow properties, anti-foamants, corrosion inhibitors (for example to inhibit gassing of metal pigments: Al gassing). The additives and auxiliary agents are added in the usual quantities well known to the man of the art, depending on the effect desired.

For producing the coating compounds, the components are mixed together in the required proportions.

The coating compounds according to the invention may be applied to different substrates by conventional coating methods such as spraying, brush coating or application with coating knife. Various materials may be used as substrates, such as metals or plastics but also wood, glass and other substrates. The coating compounds according to the invention are particularly suitable for the production of unicoats and metallic or other effect coats. They are particularly suitable for use as aqueous base coats.

The coating compounds according to the invention may be applied to a wide variety of substrates, as mentioned above. They are particularly suitable for the production of basecoats in multilayer lacquerings. The preferred field of application for this is the lacquering of motor vehicles or parts of motor vehicles. The coating compounds according to the invention are preferably self-drying systems which may be used not only for series lacquering but also for repair lacquering, in particular of motor vehicles and parts thereof.

The invention also relates to a process for the production of a multilayer coating in which, for example, any primer or bonding layer may be applied as first layer to a substrate. This layer may advantageously be produced from water dilutable coating compounds. On this first layer is applied a layer of coloured basic lacquer containing the coating compound according to the invention. This basic lacquer coat is either dried in the heat or covered wet-in-wet with another coat, optionally after a brief period of exposure to air. A clear lacquer coat is then applied. This clear lacquer may in principle consist of any known transparent or non-transparent pigmented coating compound. Conventional solvent-containing 1- or 2-component lacquers, water dilutable 1- or 2-component clear lacquers, clear lacquer powders or lacquers curable by irradiation may be used for this purpose. The basic lacquer coat and clear lacquer coat are preferably applied wet-in-wet. After their application, the clear lacquer coat and optionally also the basic lacquer coat are preferably dried in the heat. The drying conditions of the covering lacquer coating (basic lacquer and clear lacquer) depend on the clear lacquer system employed. The drying temperatures may be, for example, from 20° to 150° C. Temperatures from 20° to 80° C., for example, are preferred for repair purposes. For series lacquering, temperatures above 100° C., for example above 110° C., are preferred.

The invention also relates to a substrate coated with a multilayered coating which has been obtained by the application of at least one layer of primer preferably based on a water dilutable coating compound, the application of a colouring basic lacquer coat containing a coating compound according to the invention, optional drying of the basic coat and application of a transparent coating compound as top coat followed by heating of the coated substrate. Further layers may be added to this multilayered lacquering if desired.

The multilayered lacquering according to the invention has a good surface. Adherence between the layers and the basic lacquer coat is good and shows no signs of separation even under exposure to the atmosphere of a moisture chamber. The invention is particularly suitable for use in the lacquering of motor vehicles (series and repair lacquering).

The substrates used may be metal or plastics substrates. The substrates used in the motor vehicle industry are particularly suitable, e.g. iron, zinc, aluminium, magnesium or alloys thereof as well as polyurethanes, polycarbonates or polyolefins. These may first be coated with a primer. The coating compounds according to the invention are also eminently suitable for lacquering other substrates, in particular mineral substrates such as concrete, or wood, or for coating films (plastics and paper films) and for the production of thin layers for bonding different substrates.

The following Examples serve to illustrate the invention. Parts are parts by weight.

PREPARATION OF COMPONENT A

Example of Preparation 1

250 g of a linear polyester (synthesised from adipic acid, isophthalic acid and hexanediol, OH number 77, acid number 1.0) are heated to 70° C. together with 80 g of methyl ethyl ketone and 53.3 g of N-methylpyrrolidone in a reaction vessel equipped with stirrer, internal thermometer, heating means and reflux condenser, and 74 g of hydrogenated bisphenol A and 28.3 g of dimethylolpropionic acid are added at this temperature. The reaction mixture is heated to 120° C. and stirred at this temperature for half an hour. 146.7 g of hexamethylene diisocyanate are then added at 70° C. After an exothermic phase (temperature <90° C.) the reaction mixture is maintained at 75° C. until the residual isocyanate numbers are less than 1.8. The hot resin mixture is reacted with the stoichiometric quantity of deionised water and 23.5 g of triethylamine with vigorous stirring until no more NCO can be detected. It is then diluted with sufficient water to produce a highly fluid dispersion. The methyl ethyl ketone is distilled off under vacuum.

A transparent, aqueous dispersion having the following characteristics is obtained:

| | |
|---|---|
| Solids content | 30% |
| Acid number | 27 (mg KOH per g of solid resin). |

Example of Preparation 2

An acetonic solution of an isocyanate prepolymer is prepared from the following materials:
- 850 parts of a polyester of adipic acid, hexanediol and neopentyl glycol (molar ratio 65:35), hydroxyl number 56,
- 67.5 parts of a polyether with OH number 26 started on n-butanol, using a mixture of 83% of ethylene oxide and 17% of propylene oxide,
- 40.2 parts of dimethylolpropionic acid,
- 151.2 parts of hexamethylene diisocyanate,
- 199.8 parts of isophorone diisocyanate and
- 23.4 parts of butanediol-(1,4).

When the NCO value is about 5%, the components are reacted with 150% of the stoichiometric quantity of water and the reaction is continued until the isocyanate number is almost reduced to 0. After neutralisation with 17.8 parts of N,N-dimethyldiethanolamine, the reaction mixture is diluted with sufficient water to produce a fluid dispersion, and the acetone is distilled off under vacuum.

The dispersion obtained has a solids content of 35.2%; acid number 13 mg KOH per g solid resin.

Example of Preparation 3

1005 g of a linear polyester (OH number 102, synthesised from adipic acid, isophthalic acid and hexanediol) are heated to 90° C. in a reaction vessel equipped with stirrer, internal thermometer, heating means and reflux condenser and 1.8 g of trimethylolpropane and 393 g of isophorone diisocyanate are added at this temperature. This temperature is kept constant until the isocyanate number is 3.8. After the reaction mixture has cooled to 60° C., a solution of 35.3 g of dimethylolpropionic acid, 26.1 g of triethylamine and 250 g of N-methylpyrrolidone is added. After heating to 80° C., the temperature is kept constant until an isocyanate number of 1.5 is obtained. The reaction mixture is mixed with the molar quantity of deionised water and maintained at 80° C. until no more NCO can be detected. It is then diluted with sufficient water to form a liquid dispersion.

| | |
|---|---|
| Solids content | 32.0% by weight (30 min 150° C. in circulating air oven) |
| Acid number | 15 (mg KOH per g solid resin) |
| MEQ-value | 20.9 |
| pH value | 7.7 |
| average particle size | 123 nm |

PREPARATION OF COMPONENT B

Example of Preparation 4 a) Preparation of a carboxy functional polymer containing epoxide groups 100 g of an anhydride mixture (acid number/H$_2$O=486) prepared by the reaction of trimellitic acid anhydride with propane-1,2-diol and thus consisting of trimellitic acid anhydride and anhydrides corresponding to the following formulae I and II

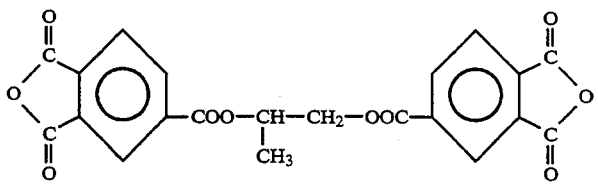

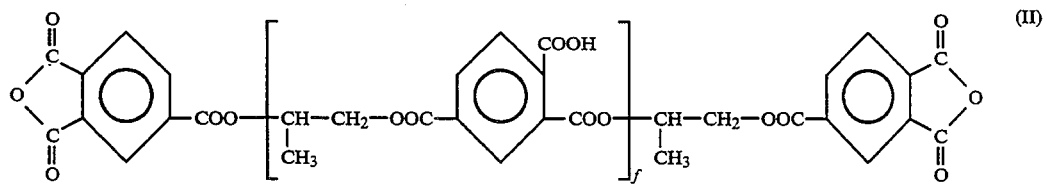

f = 1-8 which had been homogenised in 108 g of xylene at 50° C. were added dropwise within 1 hour to a solution of 141 g of a polyester (OH number=88) prepared on the basis of phthalic acid anhydride, isophthalic acid, maleic acid anhydride, propanol and glycerol as described in DE-OS 28 11 913 in 70 g of methyl ethyl ketone. The reaction mixture was stirred at 90° C. until it had an acid number in water of 165 (100% resin). 12 g of water were then added and an acid number in butanol of 168 (100% resin) was obtained after 6 hours' stirring at 80° to 90° C. The temperature of the mixture was lowered to 60° C., 132 g of an epoxidised linseed oil (epoxide number=8.7) were added dropwise within 2 hours after the addition of 0.3 g of lithium benzoate and the mixture was then stirred until the acid number in butanol had fallen to 86.5. A mixture of 42 g of dimethylamine (60% in water) in 860 g of water was then stirred in. A pale yellow, opalescent solution was obtained, from which the organic solvent was distilled off at 0.1 bar and 40° C. A yellowish, virtually clear aqueous resin solution was obtained after filtration. Solids content: 32% (1 hour at 125° C.).

b) Preparation of the polymer dispersion 705 g of the above described aqueous (32%) dispersion and 196 g of water were introduced into a reactor equipped with stirrer, reflux condenser, internal thermometer and dosing device for the monomers and the initiators. This mixture was heated to 80° C. with stirring and a solution of 0.5 g of ammonium peroxydisulphate in 35 g of water was added. 5 Minutes after the addition of the initiator, 35 g of a monomer mixture of 125 g of methyl methacrylate, 94 g of n-butylacrylate and 17 g of glycidyl methacrylate were added and the remaining quantity of monomer was added over a period of 2 hours after a further 15 minutes of prepolymerisation. 10 Minutes after all the monomer had been added, a further 0.2 g of ammonium peroxydisulphate dissolved in 10 g of water was added within 10 minutes and the reaction mixture was stirred for a further 2 hours at 80° C. to ensure complete conversion. A stable, aqueous dispersion having a solids content of about 40% was obtained.

Example of Preparation 5 a) Preparation of a carboxyfunctional polymer containing epoxide groups 100 g of anhydride mixture (acid number/H₂O=560) prepared by the reaction of trimellitic acid anhydride with propane-1,2-diol and homogenised in 30 g of acetone at 50° C. were added dropwise within one hour to a solution of 127 g of a polyester (OH number=107) in 70 g of methyl ethyl ketone. Stirring was continued at 90° C. until the reaction mixture had an acid number in water of 197 (based on 100% resin). A further 15 g of water was then added. After 6 hours' stirring at 80° to 90° C., the acid number in butanol was 180 (100% resin). The temperature of the mixture was lowered to 60° C. and 133 parts of an epoxidised linseed oil (epoxy number=8.9) were added dropwise in the course of 2 hours. The mixture was stirred until the acid number in butanol had fallen to 90. A mixture of 56 g of dimethylaminoethanol in 540 g of water was then stirred in. A pale yellow, opalescent solution was obtained, from which the organic solvent was distilled off at 0.1 bar and 40° C. A yellowish, virtually clear, aqueous resin solution was obtained after filtration. The solids content (1 h at 125° C.) was about 39%.

b) Preparation of the polymer dispersion 355 g of the (39%) aqueous dispersion from la) were mixed with 452 g of water in a reactor equipped with stirrer, reflux condenser, internal thermometer and dosing devices for the monomers and the initiator, the mixture was heated to 80° C. with stirring and a solution of 0.5 part of ammonium peroxydisulphate in 35 g of water was added. 5 Minutes after the addition of the initiator, 35 g of a monomer mixture of 165 g of methyl methacrylate, 142 g of n-butylacrylate and 24 g of hydroxyethyl acrylate were added and the remaining quantity of monomers was added over a period of 2 hours after a further 15 minutes of prepolymerisation. 10 Minutes after all the components had been added, a further 0.2 parts of ammonium peroxydisulphate dissolved in 10 g of water was added within 10 minutes and the reaction mixture was stirred at 80° C. for 2 hours to ensure complete conversion. A stable, aqueous dispersion having a solids content of about 40% was obtained.

Example of Preparation 6

Preparation of a paste resin 1395 g of a linear, saturated polyester (synthesised from adipic acid and hydroxypivalic acid neopentyl glycol ester) having an OH number of 112 and a viscosity (at 25° C.) of 8.7 Pas, 161 g of dimethylolpropionic acid and 163 g of trimethylolpropane are dissolved by heating to 90° C. in a reaction vessel equipped with internal thermometer and reflux condenser and the solution is then cooled to 50° C. After the addition of 865 g of tetramethyl xylylene diisocyanate, the reaction mixture is slowly heated to 120° C. until the isocyanate content is below 0.2%. The reaction mixture is then diluted with 861 g of methoxypropanol.

| Solids content (30 min 150° C.): | 75% by weight |
|---|---|
| Acid number (based on solids content) = | 27 |
| Viscosity at 25° C. diluted to 40% with methoxypropanol: | 210 mPas* |

A mixture of 58.3 g of dimethylethanolamine and 58.3 g of water is rapidly added to 1963 g of this resin solution and the mixture is heated to 80° C. It is then slowly diluted with water to form a cloudy, highly viscous paste which can easily be processed in the heat and has the following characteristic data:

| Solids content (30 min 150° C.) | 32.3% by weight |
|---|---|
| Viscosity at 25° C. | 1.3 Pas* |
| MEQ-value | 42 |
| pH-value | 7.6 |

*Determined in a rotary viscosimeter with coaxial cylinder device according to DIN 53 018 and 53 019 after 5 minutes' shearing under a shearing gradient of 231 sec$^{-1}$.

PREPARATION OF THE COMPONENTS FOR THE FOLLOWING EXAMPLES OF LACQUERS

Example of Preparation 7

Preparation of a binder solution 50.00 g of the water dilutable binder described above in Example of preparation 4 are mixed with
43.94 g of completely desalted water and
6.00 g of butoxyethanol and adjusted to a pH of 6.2 to 6.4 with
0.06 g of N-dimethylaminoethanol.

Example of Preparation 8

Preparationm of an aluminium paste 20.50 g of a commercial aluminium paste having a metal content of 65% are thoroughly stirred together with a mixture of
7.00 g of butoxyethanol and
14.00 g of completely desalted water, and a mixture of
4.00 g of the binder described above in Example of Preparation 4 together with
6.00 g of the binder described Example of Preparation 1,
10.00 g of butoxyethanol,
34.70 g of completely desalted water and
3.00 g of a commercial acid acrylate thickener is then added. The pH is adjusted to 6.2–6.4 with a mixture of
0.08 g of N-dimethylaminoethanol and
0.72 g of completely desalted water.

Example of Preparation 9

Preparation of a blue pigment triturate 10.00 g of Cu-phthalocyanine pigment are predispersed in
17.00 g of a commercial hexamethoxymelamine resin and
10.00 g of butoxyethanol in a dissolver and then completely dispersed in a pearl mill after the addition of a further
5.00 g of the melamine resin and
10.00 g of butoxyethanol. A mixture of
0.90 g of a commercial acid acrylic thickener and
18.91 g of completely desalted water is then added and the pH is adjusted to 7.1–7.3 with
2.00 g of N-dimethylaminoethanol and
26.19 g of completely desalted water.

Example of Preparation 10

Preparation of a green pigment triturate 20.00 g of a chlorinated phthalocyanine pigment are predispersed in a mixture of
20.00 g of the binder described above in Example of Preparation 6,
35.00 g of butoxyethanol and
0.50 g of N-dimethylaminoethanol in a dissolver and then completely dispersed in a pearl mill. The mixture is then diluted with
24.50 g of completely desalted water.

Example of Preparation 11

The procedure was the same as described in Example of Preparation 7 but using the binder (50.00 g) described in Example of Preparation 5.

Example of Preparation 12

The procedure was the same as described in Example of Preparation 8 but using the binder (4.00 g) described in Example of Preparation 5 together with the binder (6.0 g) described in Example of Preparation 1.

EXAMPLES OF LACQUER FORMULATIONS

Example 1

1.1. Preparation of a water dilutable blue metallic base lacquer 30.00 g of the binder solution described in Example of Preparation 7 are stirred together for 30 minutes with
19.00 g of the aluminium paste described in Example of Preparation 8,
1.90 g of acid acrylate thickener (as used previously),
8.94 g of completely desalted water and
0.26 g of N-dimethylaminoethanol.
Into this mixture are stirred
34.00 g of the polyurethane dispersion described in Example of Preparation 1, and
0.94 g of the pigment triturate described in Example of Preparation 9 is added.
4.00 g of n-butanol are then added with stirring and the mixture is adjusted to a viscosity of 90–95 mPas with
0.96 g of water under a shearing gradient of 100 sec$^{-1}$.

Solids content: 18.0% by weight (120 minutes in a circulating air drying oven at 120° C.).

1.2 Application of the basic lacquer and a clear lacquer

The basic lacquer described in 1.1 is applied with a compressed air atomising spray gun to a metal sheet which has been treated in the usual manner with Zn-phosphatisation, electro dip lacquer and spray primer so that a total dry film thickness of 15 μm is obtained with two applications. The conditions for application of the basic lacquer are 23° C. ambient temperature and 60% relative humidity. After application, the coated metal sheet is force dried in a circulating air drying oven at 50° C. for 5 minutes and after it has cooled to 23° C. it is coated with a commercial acrylic-melamine resin clear lacquer in the usual manner and stoved for 30 minutes at 130° C.

A uniform, unclouded coating providing an excellent metallic effect and very high gloss is thus obtained.

Example 2

2.1 Preparation of a water dilutable silver coloured metallic basic lacquer A silver coloured basic lacquer is prepared analogously to Example 1.1 from

- 40.00 g of the binder solution described in Example of preparation 11,
- 19.00 g of the aluminium paste described in Example of preparation 12,
- 1.90 g of acid acrylate thickener,
- 0.26 g of N-dimethylaminoethanol,
- 25.00 g of polyurethane dispersion (as described in Example of preparation 2),
- 4.00 g of n-butanol and
- 9.84 g of completely desalted water.

The solids content is 18.0% by weight (120 minutes in the circulating air drying oven at 120° C.). The viscosity is 90–95 mPa.s at a shearing gradient of 100 sec$^{-1}$.

2.2 Application of the basic lacquer and a clear lacquer

A pretreated metal sheet is coated with basic lacquer as described in Example 1.2 and force dried at 50° C. for 5 minutes. After cooling, it is coated with a commercial two-component acrylic isocyanate clear lacquer and stoved at 130° C. for 30 minutes.

The coating thus obtained is distinguished by great brilliance, absolutely uniform, cloud-free effect formation and a pronounced metallic effect.

Example 3

3.1 Preparation of a water dilutable green metallic basic lacquer

The basic lacquer is prepared analogously to Example 1.1 from

- 59.00 g of binder solution as described in Example of preparation 7,
- 18.50 g of aluminium paste as described in Example of preparation 8,
- 1.90 g of acid acrylate thickener,
- 0.26 g of N-dimethylaminoethanol,
- 6.00 g of polyurethane dispersion as described in Example of preparation 3,
- 0.60 g of the green pigment triturate described in Example of preparation 10,
- 4.00 g of n-butanol and
- 9.74 g of completely desalted water.

Solids content: 17.1% by weight (120 minutes in circulating air oven at 120° C.)

Viscosity: 90–95 mPas at a shearing gradient of 100 sec$^{-1}$.

Application of the basic lacquer and a clear lacquer

The basic lacquer described under 3.1 is applied as described in Example 1.2 to a pretreated metal sheet and after this basic lacquer has been force dried, it is coated with a commercial acrylic melamine clear lacquer and the coats are then stoved at 130° C. for 30 minutes. A green metallic coating which has the same advantageous properties as those of Examples 1.2 and 2.2 is obtained.

What is claimed is:

1. An aqueous coating composition, containing a binder which comprises
   (I) from 60% to 100% wt. of a mixture of
      (i) from 5% to 95% wt. solids basis based on(I) of an aqueous dispersion of one or more self-emulsifying polyurethane resins having a number average molecular weight of from 30,000 to 300,000 and containing carboxyl groups corresponding to an acid number of from 5 to 50, said resins having been obtained by chain lengthening in water a water-dispersible polyurethane prepolymer having more than one free isocyanate group per molecule, and
      (ii) from 95% to 5% wt. solids basis based on (I) of an aqueous dispersion of at least one acrylated polyester, or at least one acrylated polyurethane, or at least one acrylated polyester and at least one acrylated polyurethane, and
   (II) from 0 to 40% wt. of one or more formaldehyde condensation resin, one or more blocked polyisocyanate, or one or more formaldehyde condensation resin and one or more blocked polyisocyanate.

2. Aqueous coating compound according to claim 1, characterised in that binder component A) is obtainable by the preparation of the polyurethane prepolymer by the reaction of
   a) one or more polyisocyanates with
   b) one or more polyether diols and/or polyester diols each having a number average molar mass of from 500 to 5000, up to 30% by weight of which may be replaced by one or more low molecular weight polyhydroxyl compounds having a molar mass of from 60 to 400 and
   c) one or more dihydroxy, diamino and/or hydroxyaminoalkanes containing anionic groups
      in an NCO/OH equivalent ratio of from 1.0:1 to 2.0:1, preferably from 1.1:1 to 1.9:1, followed by chain lengthening of the polyurethane prepolymer with water.

3. Aqueous coating compound according to claim 2, characterised in that the subsequent chain lengthening of the polyurethane prepolymer with water is carried out in the organic phase in a ratio of two free isocyanate groups to from 0.5 to 3.0 mol of water.

4. Aqueous coating compound according to claim 1, characterised in that the formaldehyde condensation resins of component II) contained therein consist of one or more fully etherified amine-formaldehyde condensation resins.

5. A process for the preparation of a binder for aqueous coating compounds by the reaction of
   a) one or more polyisocyanates,
   b) one or more polyether diols and/or polyester diols, each having a number average molar mass of from 500 to 5000, up to 30% by weight of which may be replaced by one or more low molecular weight polyhydroxyl compounds having a molar mass of from 60 to 400, and
   c) one or more dimethylol alkane carboxylic acids in an NCO/OH equivalent ratio of from 1.0:1 to 2.0:1, preferably from 1.1:1 to 1.9:1, followed by chain lengthening of the polyurethane prepolymer with water.

6. A process according to claim 5, characterised in that the chain lengthening of the polyurethane prepolymer with water is carried out in the organic phase in a ratio of two free isocyanate groups to 0.5 to 3.0 mol of water.

7. A process for the preparation of aqueous coating compounds, characterised in that I) from 60 to 100% by weight of a mixture of
   A) from 5-95% by weight of one or more of the polyurethane resins obtained according to claim 5 with
   B) from 95-5% by weight of one or more acrylated polyesters and/or acrylated polyurethanes having an acid number of from 5 to 50 in aqueous dispersion is mixed with (II) from 0 to 40% by weight of one or more formaldehyde condensation resins and/or blocked polyisocyanates, the percentages by weight being in each case based on the solids content of the resin.

8. A process for preparing multilayers lacquer, which comprises applying the composition of claim 1 as a lacquer base coat or a lacquer top coat to a substrate which is optionally coated with one or more layers, optionally partially drying said base or top lacquer coat, applying a clear lacquer coat to said base or top lacquer coat, and hardening the coats.

9. The process of claim 8, wherein said substrate is a part of a motor vehicle.

* * * * *